US010208886B2

United States Patent
Yuasa (10) Patent No.: US 10,208,886 B2
(45) Date of Patent: Feb. 19, 2019

(54) HEAT-INSULATING CONTAINER PROVIDED WITH VACUUM HEAT-INSULATING MATERIAL, VACUUM HEAT-INSULATING MATERIAL, AND TANKER PROVIDED WITH HEAT-INSULATING CONTAINER

(71) Applicant: Panasonic Intellectual Property Management Co., Ltd., Osaka (JP)

(72) Inventor: Akiko Yuasa, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/504,738

(22) PCT Filed: Dec. 22, 2015

(86) PCT No.: PCT/JP2015/006387
§ 371 (c)(1),
(2) Date: Feb. 17, 2017

(87) PCT Pub. No.: WO2016/103680
PCT Pub. Date: Jun. 30, 2016

(65) Prior Publication Data
US 2017/0276286 A1 Sep. 28, 2017

(30) Foreign Application Priority Data
Dec. 26, 2014 (JP) .................................. 2014-265935

(51) Int. Cl.
*F16L 59/06* (2006.01)
*B63B 25/16* (2006.01)
(Continued)

(52) U.S. Cl.
CPC ............ *F16L 59/065* (2013.01); *B63B 25/16* (2013.01); *F17C 3/04* (2013.01); *F17C 3/08* (2013.01);
(Continued)

(58) Field of Classification Search
CPC ......... B63B 25/08; B63B 25/14; B63B 25/16; B01J 20/28; B01J 20/28033;
(Continued)

(56) References Cited

U.S. PATENT DOCUMENTS 8,864,885 B2 * 10/2014 Yuasa ................ B01J 20/28033
96/153
2013/0160652 A1 6/2013 Yuasa
2016/0069505 A1 3/2016 Yuasa

FOREIGN PATENT DOCUMENTS

CN 103994304 A 8/2014
JP H08-067292 A 3/1996
(Continued)

OTHER PUBLICATIONS

International Search Report issued in Application No. PCT/JP2015/006387 dated Mar. 22, 2016.
(Continued)

*Primary Examiner* — Lars A Olson
(74) *Attorney, Agent, or Firm* — McDermott Will & Emery LLP (57) ABSTRACT

A heat-insulating container being used under an environment where exposure to water of liquid is possible, includes a container main body having a substance holding portion which holds a substance at a temperature which is lower than a normal temperature on the inside of the substance holding portion; and a heat-insulating structure body which is provided in the container main body and includes at least a vacuum heat-insulating material. In addition, the vacuum
(Continued)

heat-insulating material includes an outer cover material and an inner member sealed in a tightly closed and decompressed state on an inside of the outer cover material. In addition, the inner member is configured of a material which does not generate hydrogen in a case of coming into contact with the moisture of the liquid.

15 Claims, 4 Drawing Sheets

(51) Int. Cl.
  *F17C 3/08* (2006.01)
  *F16L 59/065* (2006.01)
  *F17C 3/04* (2006.01)
(52) U.S. Cl.
  CPC .. *F17C 2203/032* (2013.01); *F17C 2203/035* (2013.01); *F17C 2203/0329* (2013.01); *F17C 2203/0333* (2013.01); *F17C 2203/0341* (2013.01); *F17C 2203/0345* (2013.01); *F17C 2203/0358* (2013.01); *F17C 2203/0375* (2013.01); *F17C 2203/0391* (2013.01); *F17C 2203/0395* (2013.01); *F17C 2203/0619* (2013.01); *F17C 2203/0621* (2013.01); *F17C 2203/0624* (2013.01); *F17C 2203/0626* (2013.01); *F17C 2203/0643* (2013.01); *F17C 2203/0646* (2013.01); *F17C 2203/0648* (2013.01); *F17C 2203/0651* (2013.01); *F17C 2203/0658* (2013.01); *F17C 2203/0682* (2013.01); *F17C 2221/012* (2013.01); *F17C 2221/033* (2013.01); *F17C 2260/033* (2013.01); *F17C 2260/042* (2013.01); *F17C 2270/0105* (2013.01); *F17C 2270/0134* (2013.01); *F17C 2270/0142* (2013.01); *Y02E 60/321* (2013.01)
(58) Field of Classification Search
  CPC .. B01J 20/28035; B01D 53/26; B01D 53/261; F16L 59/065; F17C 3/08
  USPC .......................................... 114/74 A; 96/153
  See application file for complete search history.

(56) References Cited

FOREIGN PATENT DOCUMENTS

| WO | 2012/032786 A1 | 3/2012 |
| WO | 2014/132665 A1 | 9/2014 |
| WO | 2014/174837 A1 | 10/2014 |

OTHER PUBLICATIONS

The Extended European Search Report dated Nov. 9, 2017 for the related European Patent Application No. 15872251.2.

* cited by examiner

HEAT-INSULATING CONTAINER PROVIDED WITH VACUUM HEAT-INSULATING MATERIAL, VACUUM HEAT-INSULATING MATERIAL, AND TANKER PROVIDED WITH HEAT-INSULATING CONTAINER

RELATED APPLICATIONS

This application is the U.S. National Phase under 35 U.S.C. § 371 of International Application No. PCT/JP2015/006387, filed on Dec. 22, 2015, which in turn claims the benefit of Japanese Application No. 4014-265935, filed on Dec. 26, 2014, the disclosures of which are incorporated by reference herein.

TECHNICAL FIELD

The present invention relates to a heat-insulating container which is provided with a vacuum heat-insulating material and stores a low-temperature substance of which a temperature is lower than a normal temperature on the inside thereof, a vacuum heat-insulating material which is used in the heat-insulating container, and a tanker which is provided with the heat-insulating container.

BACKGROUND ART

Combustible gas, such as natural gas or hydrogen gas, is gas at a normal temperature. Therefore, when storing or transporting the gas, the gas is liquefied and held in the heat-insulating container. When the natural gas that is the combustible gas is used as an example, representative examples of the heat-insulating container which holds the liquefied natural gas (LNG) include an LNG storage tank installed on the ground, or a tank of an LNG transport tanker. The LNG is a low-temperature substance of which the temperature (the temperature of the LNG is normally −162° C.) is lower than the normal temperature by 100° C. or more. Therefore, in the LNG tanks, it is required to store the low-temperature substance of which the temperature is lower than the normal temperature on the inside thereof, and to improve heat-insulating performance as high as possible.

As one example of the heat-insulating material having higher heat-insulating performance, a vacuum heat-insulating material which uses a fiber-like core material made of an inorganic material is known. A general vacuum heat-insulating material has a configuration in which the core material is sealed in a tightly closed and decompressed state, on the inside of a bag-like outer cover material having gas barrier characteristics. Examples of fields in which the vacuum heat-insulating material is employed include electronic appliances including a home refrigerator, refrigerating facility for office, and a heat-insulating wall for a house.

For example, in PTL 1, a configuration in which the vacuum heat-insulating material is employed in a heat-insulating container, such as an LNG tank. Accordingly, entering of heat into the heat-insulating container is efficiently suppressed, and further improvement of volume efficiency is expected. In the LNG tank, when the entering of the heat can be suppressed, it is possible to efficiently reduce generation of boil-off gas (BOG), and to efficiently decrease a boil off rate (BOR) of the LNG.

Here, if by any change, when a case where the heat-insulating container is exposed to water of liquid is assumed, in the vacuum heat-insulating material used in the heat-insulating container, when the outer cover material is damaged (that is, when the vacuum heat-insulating material is ruptured), it becomes apparent that it is necessary to assume that the water of the liquid enters the inside thereof, by investigation of the inventors.

For example, the liquefied gas tanker sails on the sea, and generally, comes into contact with the sea water. Therefore, when the vacuum heat-insulating material is ruptured by any accident, reaction between the sea water and the inner member can be generated at a reaction speed and with a reaction amount which are equal to or greater than assumed. This point is also similar to that of a case where the ruptured vacuum heat-insulating material comes into contact with rain water not only in the gas tanker but also in a gas tanker installed on the ground or under the ground.

However, in the heat-insulating container of the related art, influence generated by a chemical reaction between the inner member and the moisture when the vacuum heat-insulating material is ruptured, is not considered.

CITATION LIST

Patent Literature

PTL 1: Japanese Patent Unexamined Publication No. 8-67292

SUMMARY OF THE INVENTION

In the present invention, considering the problem, in a heat-insulating container being used under the environment where exposure to moisture of liquid is possible, even in a case where a vacuum heat-insulating material used in the heat-insulating container is ruptured and the moisture of the liquid comes into contact with an inner member, it is possible to avoid or suppress influence on a stored low-temperature substance.

A heat-insulating container of the present invention which is used under an environment where exposure to moisture of liquid is possible, includes a container main body having a substance holding portion which holds a substance at a temperature which is lower than a normal temperature on the inside of the substance holding portion; and a heat-insulating structure body which is provided in the container main body, and includes at least a vacuum heat-insulating material. In addition, the vacuum heat-insulating material includes an outer cover material, and an inner member which is sealed in a tightly closed and decompressed state on an inside of the outer cover material. In addition, the inner member is configured of a material which does not generate hydrogen in a case of coming into contact with the moisture of the liquid.

In addition, a vacuum heat-insulating material of the present invention which is employed in a heat-insulating container being used under the environment that exposure to moisture of liquid is possible, includes a container main body having a substance holding portion which holds a substance at a temperature which is lower than a normal temperature on an inside of the substance holding portion, and a heat-insulating structure body which is provided in the container main body, and uses at least a vacuum heat-insulating material. In addition, the vacuum heat-insulating material includes an outer cover material, and an inner member which is sealed in a tightly closed and decompressed state on an inside of the outer cover material. The inner member is configured of a material which does not generate hydrogen in a case of coming into contact with the moisture of the liquid.

In addition, a tanker of the present invention includes the above-described heat-insulating container, and the substance is liquefied natural gas or hydrogen.

According to the present invention, when the inner member of the vacuum heat-insulating material and the moisture react to each other, by observing the hydrogen generation which is assumed not to be preferable as influence on a stored low-temperature substance, and by suppressing a possibility of the worst case caused by the hydrogen generation, it becomes possible to substantially improve reliability of the heat-insulating container provided with the vacuum heat-insulating material.

According to the above-described configuration, in the heat-insulating container being used under the environment where the exposure to the water of the liquid is possible, even in a case where the vacuum heat-insulating material used in the heat-insulating container is ruptured and the moisture of the liquid comes into contact with the inner member, it is also possible to avoid or suppress the influence on the stored low-temperature substance.

DESCRIPTION OF EMBODIMENT

Hereinafter, preferable exemplary embodiments of the present invention will be described with reference to the drawings. In addition, in the following examples, the same elements and corresponding elements are given the same reference numerals through all of the drawings, and overlapping description thereof will be omitted.

First Exemplary Embodiment

[Heat-Insulating Container]

First, a first exemplary embodiment of the present invention will be described.

Figure 1A:
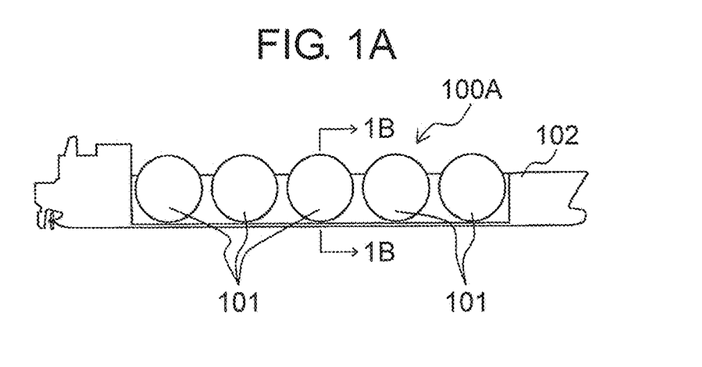
FIG. 1A is a schematic view illustrating a schematic configuration of a spherical independent tank type LNG transport tanker provided with a spherical tank which is a heat-insulating container according to a first exemplary embodiment of the present invention.

In the exemplary embodiment, a heat-insulating container, that is, an LNG spherical tank 101 provided in an LNG transport tanker 100A as illustrated in FIG. 1A will be described as a representative example of a heat-insulating container which is used under the environment where exposure to water of liquid is possible and holds a substance at a temperature which is lower than a normal temperature.

In addition, in the exemplary embodiment, the substance which is held at the temperature which is lower than the normal temperature will be described as LNG which is a fluid, but the present invention is not limited to the example, and the material may be, for example, a solid body.

As illustrated in FIG. 1A, the LNG transport tanker 100A in the exemplary embodiment is a spherical independent tank type tanker, and is provided with a plurality of spherical tanks 101 (five in total in FIG. 1A).

Figure 1B:
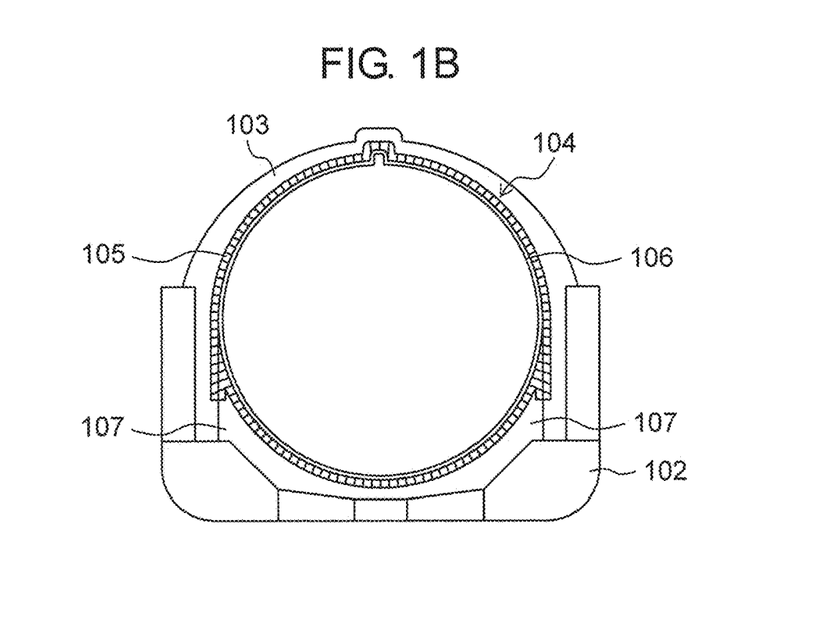
FIG. 1B is a schematic view illustrating a schematic configuration of a spherical tank which corresponds to a section taken along an arrow 1B-1B of FIG. 1A.

The plurality of spherical tanks 101 are arranged in one row along the longitudinal direction of a ship body 102 (trunk body). As illustrated in FIG. 1B, each of the spherical tanks 101 is provided with a container main body 104, and the inside of the container main body 104 is an inner space (substance holding portion) in which liquefied natural gas (LNG) is stored (held). In addition, a large part of the spherical tank 101 is supported from the outside by the ship body 102, and an upper part thereof is covered with a cover 103.

As illustrated in FIG. 1B, the container main body 104 includes a container housing body 106 and a heat-insulating structure body 105 which heat-insulates an outer surface of the container housing body 106. Similar to the LNG, the container housing body 106 is configured to be capable of holding a low-temperature substance held at the temperature which is lower than the normal temperature, and is made of metal, such as stainless steel or aluminum alloy. Since the temperature of the LNG is normally −162° C., as a specific container housing body 106, a member which is made of aluminum alloy having a thickness of approximately 50 mm is used. In addition, the container housing body 106 may be made of stainless steel having a thickness of approximately 5 mm.

The heat-insulating structure body 105 may be employed as long as the heat-insulating structure body 105 is configured by using at least a vacuum heat-insulating material which will be described later. As a representative example of the heat-insulating structure body 105, a multilayer structure body in which a plurality of heat-insulating layers are disposed on the outside of the container housing body 106 can be employed. Among the plurality heat-insulating layers, the vacuum heat-insulating material may be used at least on one layer. Among the plurality of heat-insulating layers, for example, a heat-insulating panel which configures the heat-insulating material in a shape of a panel can be employed. Therefore, in the exemplary embodiment, the vacuum heat-insulating material which will be described later can also be used as the heat-insulating panel.

As a heat-insulating material which can be used as the heat-insulating panel, in addition to the vacuum heat-insulating material, a material which is selected from a foam resin-based heat-insulating material, such as styrene foam, polyurethane foam, and phenolic foam; and an inorganic heat-insulating material, such as glass wool that fills a heat-insulating frame and pearlite. It is needless to say that the heat-insulating material may be configured of a known heat-insulating material in addition thereto. In addition, a shape of the heat-insulating panel is also not particularly limited, but a squared shape can be exemplified. In a case where the heat-insulating layer is configured of a squared heat-insulating panel, on the outside of the container housing body 106, the squared heat-insulating panels are disposed by a unit of several thousand of panels, and are fixed.

The container main body 104 is fixed to the ship body 102 by a support body 107. The support body 107 is generally referred to as a skirt, and has a thermal brake structure. The thermal brake structure is a structure in which stainless steel having low thermal conductivity is inserted, for example, between aluminum alloy and a low-temperature steel material, and can achieve reduction of heat entering.

[Vacuum Heat-Insulating Material]

Next, a representative example of the vacuum heat-insulating material used in the heat-insulating structure body 105 will be specifically described with reference to FIG. 2.

Figure 2:
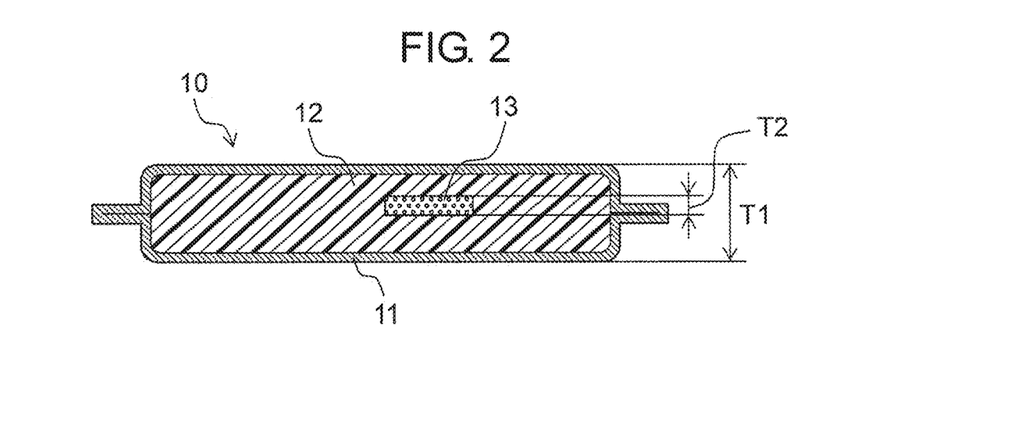
FIG. 2 is a schematic sectional view illustrating a configuration example of a vacuum heat-insulating material used in a heat-insulating structure body provided with the spherical tank illustrated in FIG. 1B.

As illustrated in FIG. 2, a vacuum heat-insulating material 10 according to the exemplary embodiment includes an outer cover material 11 (outer package material), and an inner member which is sealed in a tightly closed and decompressed state (substantially vacuum state) on the inside of the outer cover material 11. When the outer cover material 11 is ruptured (damaged or the like) and the water of liquid enters the inside, in a case of coming into contact with the moisture, the inner member is configured of a material which does not cause a chemical reaction as hydrogen is generated. The vacuum heat-insulating material 10 according to the exemplary embodiment has a core material 12 and an adsorbent 13 as the inner member.

The outer cover material 11 is a bag-like member having gas barrier characteristics, and in the exemplary embodiment, for example, by making two layered sheets oppose each other and sealing the circumference thereof, the shape of a bag is achieved. A location (sealing portion) sealed in the circumference is in a state where the core material 12 does not exist on the inside thereof, and the layered sheets come into contact with each other, and is formed in a shape of a fin which extends toward an outer circumference from a main body of the vacuum heat-insulating material 10.

A specific configuration of the layered sheet is not particularly limited, but for example, a configuration in which three layers including a surface protection layer, a gas barrier layer, and a thermal welding layer are layered in order can be employed. More specifically, for example, as the front protection layer, a nylon film having a thickness of 35 μm is employed, as the gas barrier layer, an aluminum foil having a thickness of 7 μm is employed, and as the thermal welding layer, a low-density polyethylene film having a thickness of 50 μm is employed, but the configuration is not particularly limited thereto. In addition, as the outer cover material 11, in addition to the layered sheet, a known configuration can be employed as long as the configuration can achieve the gas barrier characteristics.

The core material 12 is not particularly limited as long as the material has heat-insulating performance. Specifically, a known material, such as a fiber material or a foam material, can be employed. For example, in the exemplary embodiment, an inorganic fiber is used as the core material 12. The inorganic fiber may be a fiber which is made of an inorganic material, and specifically, for example, a fiber which is selected from a glass fiber, a ceramic fiber, a slag wool fiber, and a rock wool fiber can be employed. In addition, since the core material 12 may be used being formed in a shape of a plate, in addition to the inorganic fibers, at least one of a known binder material and powder may be included. The materials contribute to improving properties, such as strength, uniformity, and rigidity of the core material 12.

As the core material 12, a known fiber may be used in addition to the inorganic fiber, but in the exemplary embodiment, for example, as the inorganic fiber, a glass fiber (a glass fiber having a relatively large fiber diameter) of which an average fiber diameter is within a range of 4 μm to 15 μm is used, and further, the glass fiber is fired and used. If the core material 12 is the inorganic fiber, even when the outer cover material 11 is ruptured and the water of the liquid comes into contact therewith, the chemical reaction according to the generation of hydrogen is not generated. This is because a bonding strength between elements is high, and the chemical reaction is unlikely to be generated even when being exposed to the moisture since element bond in glass is covalent bond.

In the core material 12, as long as the material is covalently bonded, not a hydrogen generation amount of each element which configures the material, but a hydrogen generation amount per 1 g of a final product (the material configured of various elements itself) may be less than 80 mL. A measuring method of the hydrogen generation amount per 1 g of, for example, glass fiber which corresponds to the main idea of the exemplary embodiment is a method of measuring the hydrogen generation amount of not the element which configures the glass fiber but the glass fiber itself and the hydrogen generation amount measured by the measuring method may be less than 80 mL.

As described above, in the exemplary embodiment, in a case where the material which forms the inner member of the vacuum heat-insulating material 10 has the covalent bond (chemical bond generated as coatoms share electrons with each other), since the bonding strength is extremely high, it is appropriate to measure the reaction to the moisture in the final product which is called the core material or the adsorbent. Additionally, even when the material which forms the inner member has ion bond (chemical bond by electrostatic attraction between a cation having a positive charge and an anion having a negative charge), since the bonding strength between the elements is high, it is appropriate to measure the reaction to the moisture in the final product which is called the core material or the adsorbent.

Meanwhile, in a case where the material which forms the inner member has metallic bond, since the bonding strength is low, it is appropriate to measure the reaction between the metal element included in the final product itself (element before alloying) and the moisture. The metal element emits several electrons, and becomes the cation (metal atomic nucleus having a positive charge that exists at a lattice point of metal crystal) and a free electron (having a negative charge that widens in the entire crystal). A free electron moves around between the cations that are regularly arranged, and the bond obtained by combination by Coulomb force (electrostatic force, electrostatic attraction) that works therebetween.

In the exemplary embodiment, as described above, in a case where the reaction to the moisture is measured in accordance with the combined state of the materials, by configuring the core material 12 to make the hydrogen generation amount per 1 g less than 80 mL, it is possible to realize the vacuum heat-insulating material 10 having high reliability.

In addition, by using the inorganic fiber as the core material 12, it is also possible to reduce deterioration of a degree of vacuum since remaining gas is discharged from components of the core material 12 on the inside of the vacuum heat-insulating material 10. Furthermore, when the core material 12 is the inorganic material, since absorbency (hygroscopicity) of the core material 12 is low, it is possible to maintain the moisture amount on the inside of the vacuum heat-insulating material 10 to be low.

In addition, by firing the inorganic fiber, even in a case where the outer cover material 11 is ruptured, the core material 12 does not largely swell up, and it is possible to hold the shape as the vacuum heat-insulating material 10. Specifically, for example, when sealing the inorganic fiber as the core material 12 without firing, according to the condition, the swelling when the rupture is generated can become 3 to 10 times that before the rupture. Meanwhile, by forming the core material 12 by firing the inorganic fiber, it is possible to suppress expansion when the rupture is generated to be less than three times. Therefore, by performing the firing processing with respect to the inorganic fiber which becomes the core material 12, it is possible not only to avoid a concern about generation of hydrogen, but also to efficiently suppress the expansion when the rupture is generated, and to improve dimension stability (that is, shape holding properties of the heat-insulating structure body 105) of the vacuum heat-insulating material 10.

Here, in the configuration in which "the dimension stability (shape holding properties) of the vacuum heat-insulating material 10 is high" in the exemplary embodiment, as long as the core material 12 is configured of a material which is the fiber member, and which does not use the binder containing an organic material, is employed, a case the thickness after a partial rupture is less than three times compared to the thickness of the vacuum heat-insulating material 10 before the rupture can be considered as a case where the firing processing is performed with respect to the core material 12. This is because it is necessary to perform plastic deformation by the firing after improving the shape holding properties since a restoring force acts only by compressing the core material 12.

In addition, a firing condition of the inorganic fiber is not particularly limited, and it is possible to appropriately use various known conditions. In addition, the firing of the inorganic fiber is preferable processing in the exemplary embodiment, but is not necessary processing.

In addition to the inorganic fiber, as a material which can be used as the core material 12, a thermosetting foam body can be employed. The thermosetting foam body may be formed by foaming a thermosetting resin or a resin composition (thermosetting resin composition) including the thermosetting resin by a known method. Specific examples of the thermosetting resin can include an epoxy resin, a phenol resin, an unsaturated polyester resin, a urea resin, a melamine resin, polyimide, and polyurethane, but the thermosetting resin is not particularly limited thereto. In addition, a foaming method is also not particularly limited, and foaming may be performed under a known condition by using a known foaming agent.

When the core material 12 is configured of the thermosetting foaming body, similar to the inorganic fiber, even when the outer cover material 11 is ruptured and comes into contact with the water of the liquid, a chemical reaction according to the hydrogen is not generated. In addition, since the thermosetting foaming body has more excellent formability than that of the inorganic fiber, it is possible to contribute to improving properties, such as a shape stability, strength, and rigidity of the core material 12. In addition, in addition to the inorganic fiber and the thermosetting foaming body, as a material which can be used as the core material 12, a known organic fiber (fiber made of an organic material) can be employed, but specific types thereof are not particularly limited.

Next, the adsorbent 13 adsorbs and removes the remaining gas (also including vapor) discharged from fine cavity or the like of the core material 12, and external gas (also including vapor) which slightly enters from the sealing portion or the like, after the core material 12 is tightly sealed and decompressed on the inside of the outer cover material 11. Therefore, the adsorbent 13 may be configured to be capable of adsorbing gas (including vapor) on the inside of the outer cover material 11, but in the exemplary embodiment, as will be described later, the adsorbent 13 is configured of a material which does not cause hydrogen generation in a case of coming into contact with the moisture.

In addition, in the exemplary embodiment, as the inner member of the vacuum heat-insulating material 10, the core material 12 and the adsorbent 13 are employed, but as the inner member, members other than the core material 12 and the adsorbent 13 may be included. In this case, the other inner members may be configured of a material which does not cause hydrogen generation in a case of coming into contact with the moisture.

[Material which does not Generate Hydrogen in Case of Coming into Contact with Water]

Among the inner members of the vacuum heat-insulating material 10, a fiber material or a foaming material which is used as the core material 12 do not generally generate hydrogen in a case of coming into contact with the water. However, as the material used as the adsorbent 13, there is a case where a material which comes into contact with the water and causes generation of hydrogen is used. This is because, generally, a chemical adsorbent is considered preferable as the adsorbent 13.

The chemical adsorbent adsorbs gas which is an adsorbate by a chemical adsorbing action. Therefore, for example, when various environmental factors which increase the temperature are generated, and the chemical adsorbent can be somehow influenced, the gas which is once adsorbed is also practically prevented from being discharged again. Therefore, in a case of handling combustible fuel or the like as a substance to be held, by some influence, when the chemical adsorbent adsorbs combustible gas, after this, there is not a case where the gas is discharged again due to the influence, such as an increase in temperature or the like. Therefore, it is possible to improve stability as the vacuum heat-insulating material 10.

In addition, compared to a physical adsorbent, the chemical adsorbent generally has a large gas absorbed amount per unit weight. Therefore, when comparing the physical adsorbent and the chemical adsorbent which can adsorb the same amount of gas, the chemical adsorbent also has an advantage that a volume that occupies the adsorbent 13 can be reduced on the inside of the vacuum heat-insulating material 10.

However, as described above, among the chemical adsorbents, there is a case where a material which comes into contact with the water and generates the chemical reaction that causes the hydrogen generation is used. In the related art, even when such a chemical adsorbing material (for convenience, referred to as "chemical adsorbing material which can generate hydrogen") is used as the adsorbent 13 of the vacuum heat-insulating material 10, a problem to be investigated in some manner was not generated since the material contributes to improving the stability of the vacuum heat-insulating material 10. However, similar to the spherical tank 101 of the LNG transport tanker 100A, in the heat-insulating container which is used under the environment where the exposure to the water of the liquid is possible, and holds the substance at a temperature that is lower than the normal temperature, and in the vacuum heat-insulating material 10 used in the heat-insulating structure body 105, it becomes necessary to consider correspondence if by any chance the outer cover material 11 is ruptured.

When the chemical adsorbing material which can generate hydrogen is in a tightly closed and held state on the inside of the vacuum heat-insulating material 10, a case of reaction to a large amount of water at the same time practically does not occur. Vapor exists on the inside of the vacuum heat-insulating material 10, and when the vapor is adsorbed by the chemical adsorbing material which can generate the hydrogen, the amount of hydrogen to be generated is also extremely small. Therefore, as the adsorbent 13, in addition to the chemical adsorbing material which can generate hydrogen, when a material which can adsorb the hydrogen is used together, it is possible to excellently adsorb the gas on the inside of the vacuum heat-insulating material 10 by the adsorbent 13.

Meanwhile, if by any chance the outer cover material 11 is ruptured, similar to the spherical tank 101, in the heat-insulating container which is used under the environment where the exposure to the water of the liquid is possible, there is a possibility that the water which is the liquid enters the inside due to the rupture of the outer cover material 11. Here, when the chemical adsorbing material which can generate hydrogen is used as the adsorbent 13, on the inside of the vacuum heat-insulating material 10, since gas (including vapor) is chemically adsorbed for a long period of time, it is necessary to estimate a certain adsorbed amount in the adsorbent 13. Therefore, a weight of the chemical adsorbing material which is included in the adsorbent 13 and can generate hydrogen itself relatively increases. When the water of the liquid comes into contact with the adsorbent 13, the water and the chemical adsorbing material which can generate hydrogen rapidly react to each other, a large amount of hydrogen is generated, and in the worst case, there is also a possibility of ignition.

When the large amount of hydrogen is generated on the inside of the vacuum heat-insulating material 10, before the hydrogen is extracted from the rupture location of the outer cover material 11, the hydrogen is accumulated on the inside of the bag-like outer cover material 11, and there is a possibility that the vacuum heat-insulating material 10 expands. In addition, since the inside of the expanded vacuum heat-insulating material 10 is in a state of being filled with the hydrogen that is a combustible gas, in the worst case, there is also a possibility of ignition due to fire having a slight degree of spark. In the exemplary embodiment, since the LNG is held in the spherical tank 101, a situation where the ignition of hydrogen should be avoided is achieved.

Here, in the exemplary embodiment, as the inner member of the vacuum heat-insulating material 10, and particularly, as the adsorbent 13, a material (a material which avoids or suppresses generation of hydrogen even when coming into contact with the water of the liquid) which does not practically cause hydrogen generation even when coming into contact with the water, is used. Accordingly, even when the outer cover material 11 is ruptured, it is possible to avoid generation of hydrogen on the inside of the vacuum heat-insulating material 10. Therefore, in a case where the vacuum heat-insulating material 10 used in the spherical tank 101 is ruptured and the water of the liquid comes into contact with the inner member, it is possible to avoid or suppress influence on the low-temperature substance, such as the stored LNG.

A material which is used in the adsorbent 13 and does not practically generate hydrogen even when coming into contact with the water is not particularly limited, but for example, as an element material which forms the adsorbent 13, a material which satisfies at least one condition among (1) a material which does not chemically react to the water, (2) a material of which the hydrogen generation amount per 1 g is less than 80 mL when chemically reacting to the water, and (3) a material of which a standard electrode potential is equal to or greater than −2.0 V, may be used.

First, as (1) the material which does not chemically react to the water, a physical adsorbent can be employed. As a representative physical adsorbent, a material which is selected from zeolite, activated carbon, silica gel, diatom earth and the like, can be employed. Only one type of the physical adsorbents may be used, or two or more types may be used being selected and combined with each other.

In addition, since a material which does not chemically react to the water exists among the chemical adsorbents, the material which does not react to the water is not limited to the physical adsorbent. For example, since ZSM-5 type zeolite is a gas adsorbent (that is, the chemical adsorbent) having a chemical adsorbing action, but does not come into contact with the water and does not generate hydrogen, it is possible to appropriately use ZSM-5 type zeolite as a material that satisfies the above-described condition (1). In particular, when the ZSM-5 type zeolite is "copper ion exchange ZSM-5 type zeolite" which exchanges ion and leads copper ion, it is possible to improve adsorbing properties of not only the vapor but also nitrogen or the like. Therefore, as the adsorbent 13 which satisfies the above-described condition (1), the ZSM-5 type zeolite can be appropriately used.

Next, as (2) the material of which the hydrogen generation amount per 1 g is less than 80 mL when chemically reacting to the water, a material which is a material that chemically reacts to the water, or a material which is a material that can chemically react to the water according to the condition and which is a material of which the hydrogen generation amount per 1 g led out by a chemical reaction formula is less than 80 mL, may be employed. When the hydrogen generation amount per 1 g of the material is less than 80 mL, even when considering an internal volume or the like of the vacuum heat-insulating material 10, before the hydrogen is extracted from the rupture location, it can be determined that a state where the hydrogen is accumulated on the inside of the bag-like outer cover material 11 is practically avoided. Accordingly, it is possible to assume that the hydrogen generation is not caused even in a case where the moisture comes into contact with the material.

Here, the element material in the exemplary embodiment indicates the element itself when an element component included in the adsorbent is specified. For example, generally, there is a case where alloy is used as the adsorbent, but since the bond between the elements is weak in a case of metal bond of alloy, the chemical reaction to the water is easily performed. Accordingly, the material made of the metal bond is not the alloy, but as the element material, a condition is determined by the hydrogen generation amount when the hydrogen generation amount per 1 g is measured. Therefore, in other words, the above-described condition (2) in the exemplary embodiment can be a condition that the hydrogen generation amount per 1 g of element material which configures the adsorbent 13 is less than 80 mL.

In addition, as (3) the material of which a standard electrode potential is equal to or greater than −2.0 V, a material of which an electrode potential which is an electrode potential in a standard state in an electric chemical reaction, that is, an electrode potential when a standard hydrogen electrode is a reference (±0 V) is equal to or greater than −2.0 V, may be employed. In a case of a material of which the standard electrode potential is equal to or greater than −2.0 V, under the condition of the normal temperature, it is determined that the chemical reaction to the water rarely occurs, and thus, the material becomes a material which does not cause the hydrogen generation even in a case of coming into contact with the moisture.

As a material which can chemically react to the water, typically, a metal material having a large ionization tendency. Since the standard electrode potential is high and the hydrogen generation amount per 1 g is equal to or greater than 80 mL in the metal material having a large ionization tendency, the metal material is excluded from the material exemplified in the above-described (2) and (3).

In the exemplary embodiment, as the metal material which is reliably excluded from the material which does not cause the hydrogen generation even when coming into contact with the water, a metal element of the group 1 in the periodic table (alkali metal) and a metal element of the group 2 in the periodic table excluding Be (Mg and alkaline earth metal) are employed. The metal elements chemically react to the water under the condition of the normal temperature, and can generate hydrogen. Standard electrode potentials of Li, Cs, Rb, K, Ba, Sr, Ca, Na, and Mg (for convenience, referred to as a first metal element group) which can be generally used as elements of the group 1 and the group 2 in the periodic table increase in the description order (that is, in the metal element group, the standard electrode potential of Li is the lowest, and the standard electrode potential of Mg is the highest). Since any of the standard electrode potentials of the metal elements is equal to or less than −2.35 V, the standard electrode potentials are excluded from the above-described condition (3).

In other words, a substance of which the standard electrode potential is relatively low other than Li, Cs, and Rb is preferable.

In addition, when any of the metal element of the group 1 in the periodic table and the metal element of the group 2 in the periodic table reacts to the water, hydrogen of which the amount per 1 g is equal to or greater than 80 mL is generated (in Cs having the lowest hydrogen generation amount, hydrogen of which the amount per 1 g is equal to or greater than 84 mL is generated). Therefore, the metal elements are also excluded from the above-described condition (2).

In addition, the metal material generally does not cause hydrogen generation even when coming into contact with the water, but under a chemically active condition, a metal material which generates a chemical reaction that causes hydrogen generation also exists. The metal materials can be generally used in the adsorbent 13 as a material which satisfies the above-described conditions (2) and (3). For example, standard electrode potentials of Be, Al, Zr, Mn, Ta, Zn, Cr, Fe, Cd, Co, and Ni (for convenience, referred to as a second metal element group) increases in the description order (that is, in the second metal element group, the standard electrode potential of Be is the lowest, and the standard electrode potential of Ni is the highest). Any standard electrode potential of the second metal element group is equal to or greater than −2.0 V (for example, the lowest standard electrode potential of Be is −1.9 V). Therefore, since the metal material included in the second metal element group corresponds to the above-described condition (3), the metal material can be appropriately used as the adsorbent 13.

However, when the metal materials of the above-described second metal element group become chemically active to a degree of being capable of reacting to the water, any hydrogen generation amount per 1 g exceeds 80 mL (for example, in Cd of which the hydrogen generation amount is the lowest, the hydrogen generation amount per 1 g is 200 mL). In a case where there is a possibility that the adsorbent 13 becomes chemically active when the outer cover material 11 is ruptured due to a use condition of the heat-insulating container of the spherical tank 101 or the like, a material which corresponds to the above-described condition (3) and is excluded from the condition (2), can also be excluded as a material of the adsorbent 13. In other words, since the metal material of the second metal element group satisfies the above-described condition (2), basically, the metal material can be appropriately used as the adsorbent 13, but according to the use condition of the heat-insulating container, there is a case where the metal material is not used as the adsorbent 13.

In addition, in the second metal element group, the standard potential of Ni is the highest (−0.257 V), but in a case of a material having a standard electrode potential that exceeds the standard potential of Ni, it is determined that the material practically does not chemically react to the water even under the chemically active condition. Therefore, in the above-described condition (3), it is more preferable that the standard electrode potential of the material is equal to or greater than −0.26 V. Examples of the metal material include Sn, Pb, Sb, Bi, Cu, Hg, Ag, Pd, Ir, Pt, and Au.

Since standard electrode potentials of the metal element groups (for convenience, referred to as a third metal element group) increase in the description order, in the third metal element group, the standard electrode potential of Sn is the lowest (−0.1315 V). In addition, since the standard electrode potentials of Sn and Pb are lower than the standard hydrogen electrode (±0 V) (the standard electrode potential of Pb is −0.1263 V), theoretically, there is a possibility that hydrogen is generated by the chemical reaction to the water. However, when the standard electrode potential is equal to or greater than −0.26 V, since a difference between the standard electrode potential and the potential of a standard hydrogen electrode is sufficiently small even in a chemically active state, it is determined that the material practically does not react to the water. Therefore, the third metal element group can be a material which satisfies the above-described condition (3) and the condition (1) at the same time.

In addition, in the description above, as an example of the material which satisfies the conditions (1) to (3), the metal element is illustrated, but it is needless to say that the present invention is not limited thereto, and a compound of the metal element or a compound (organic compound) of a non-metal element may be employed as long as the material satisfies at least one of the conditions (1) to (3).

Here, a use state of the material used as the adsorbent 13 is not particularly limited, and various known states, such as a shape of particles (shape of powder), a shape of a block (shape of a tablet), and a shape of a sheet, can be employed. In particular, in a case of the shape of particles, since the adsorbed amount increases when the surface area increases similar to a porous body, and this is preferable, at least one of four conditions that (i) 80% by volume or more of particles of which a particle diameter is within a range of 0.01 to 1400 μm are included, (ii) an average particle diameter is within a range of 0.01 to 1400 μm, (iii) density is within a range of 0.2 to 1.4 g/mL, and (iv) a specific surface area is within a range of 200 to 2000 μm²/g, may be satisfied. In addition, it is preferable to satisfy all of the conditions.

Here, regarding the density, in a case where the adsorbent is a solid type, a case where the density of the adsorbent is within the above-described range becomes a condition. In addition, in a case where the adsorbent is powder, a condition that bulk density is within a predetermined range is achieved. The bulk density is a value obtained by dividing a mass of the powder by the volume including the space between the particles by filling the container having a known volume with the powder. As an example of the measuring method, it is possible to acquire the value by dividing the filled adsorbent mass by 100 by providing a funnel in an opening portion of a measuring cylinder having a capacity of 500 ml and by filling the inside with 100 ml of adsorbent from above. In the exemplary embodiment, after filling the inside with the adsorbent, tapping is performed 20 times, and a value obtained by dividing the adsorbent mass by the volume after the tapping is also considered as the bulk density.

In addition, the specific surface area can be calculated from the amount obtained by adsorbing molecule ascertained from an adsorption occupied area on the surface of powder particles and by measuring an adsorption and desorption isothermal curve by a constant volume method. In general, the specific surface area is measured by adsorbing liquid nitrogen by a commercial BET specific surface area measuring apparatus which uses the above-described principle.

In particular, in a case where the physical adsorbent is used as the adsorbent 13, and generally, since the adsorbed amount of the adsorption amount per unit weight of the physical adsorbent is smaller than that of the chemical adsorbent, and from the viewpoint of improving the adsorption function, at least one condition among the above-described four conditions may be satisfied. In addition, it is preferable to satisfy all of the above-described conditions (i) to (iv). In addition, even in a case where the chemical adsorbent is used as the adsorbent 13, when the chemical adsorbent has a shape of particles, at least one condition among the above-described four conditions. In addition, it is preferable to satisfy all of the above-described conditions (i) to (iv). In addition, even in a case where the physical adsorbent and the chemical adsorbent are used together as the adsorbent 13, when the shape of particles is used, at least one condition among the above-described four conditions may be satisfied. In addition, similarly, it is preferable to satisfy all of the conditions (i) to (iv).

Among the above-described conditions, the condition (i), that is, a condition that a range of 80% by volume or more of particles in all of the particles is within a range of 0.01 to 60 μm, is more preferable. In addition, the condition (ii), that is, a condition that the average particle diameter is within a range of 0.01 to 20 μm, is more preferable. In addition, the condition (iv), that is, a condition that the specific surface area is within a range of 200 to 800 m²/g, is more preferable. Accordingly, even in a case where at least the physical adsorbent is used as the adsorbent 13, it is possible to achieve excellent adsorption performance.

In addition, in a case where the material used as the adsorbent 13 is in a shape of a block or in a shape of a sheet, it is preferable that the shape of the adsorbent 13 is processed to have (I) a shape of which a thickness T2 (unit: mm) which is equal to or less than 60% of a thickness T1 (unit: mm) of the vacuum heat-insulating material 10 (refer to FIG. 2), or (II) a shape of which a ratio of a sectional area CS (unit: mm²) of a surface vertical to the thickness T2 (unit: mm) in the thickness direction is within a range of T2:CS=1: 100 to 1:250. It is needless to say that both of the conditions (I) and (II) may be satisfied.

The above-described condition (I), that is, the condition that the thickness T2 of the adsorbent 13 is equal to or less than 60% of the thickness T1 of the vacuum heat-insulating material 10 is satisfied, it is possible to suppress heat transfer via the adsorbent 13 in the thickness direction of the vacuum heat-insulating material 10. In addition, the condition (II), that is, the condition that thickness T2 of the adsorbent 13:sectional area CS=1:100 to 1:250 is satisfied, it is possible to suppress the heat transfer via the adsorbent 13 in the thickness direction of the vacuum heat-insulating material 10, to realize excellent adsorption performance on the inside of the vacuum heat-insulating material 10, and further, also to achieve excellent shape holding properties of the adsorbent 13.

In addition, regarding the above-described condition (I), when the thickness T2 of the adsorbent 13 exceeds 60% of the thickness T1 of the vacuum heat-insulating material 10, the heat transfer via the adsorbent 13 becomes larger in the thickness direction of the vacuum heat-insulating material 10. In addition, from the viewpoint of more efficiently suppressing the heat transfer via the adsorbent 13, it is more preferable that the thickness T2 of the adsorbent 13 is equal to or less than 50% of the thickness T1 of the vacuum heat-insulating material 10.

Furthermore, regarding the above-described condition (I), when the thickness T2 of the adsorbent 13 exceeds 30% and is equal to or less than 60% of the thickness T1 of the vacuum heat-insulating material 10, it is preferable that upper and lower surfaces in the thickness direction are layered or covered by the heat-insulating member. For example, it is possible to cover both of the upper and lower surfaces of the adsorbent 13 with the inorganic fiber which is similar to the core material 12 or non-woven fabric of the inorganic fiber (for example, glass cloth). In addition, it is possible to cover both of the upper and lower surfaces of the adsorbent 13 with a material having a high heat transfer properties. For example, by layering a carbon sheet on both of the upper and lower surfaces of the adsorbent 13, since the heat transferred to the adsorbent 13 escapes to the core material 12 in the vicinity by the carbon sheet, as a result, it is possible to improve heat-insulating properties of the adsorbent 13.

In addition, regarding the above-described condition (II), when the ratio of the sectional area CS with respect to the thickness T2 of the adsorbent 13 is lower than the above-described lower limit (T2:CS=1:100), the adsorbent 13 becomes relatively thick, and there is a possibility that it is not possible to efficiently suppress the heat transfer via the adsorbent 13. In addition, when the ratio of the sectional area CS with respect to the thickness T2 of the adsorbent 13 exceeds the above-described upper limit (T2:CS=1:250), the adsorbent 13 becomes relatively thin, and there is a possibility that the time (inner portion reaching time) until the adsorption material (gas) reaches the inside from the outer surface of the adsorbent 13 is two short, and the adsorbent 13 cannot sufficiently adsorb the adsorption material. In addition, as the adsorbent 13 becomes relatively thin, damage, such as cracking or chipping, is likely to be generated, and there is also a possibility that the shape holding properties deteriorate.

In addition, in the exemplary embodiment, both of the units of the thickness T1 of the vacuum heat-insulating material 10 and the thickness T2 of the adsorbent 13 are (mm), and the unit of the sectional area CS of the adsorbent 13 is (mm$^2$), but when the ratio of the thickness or the ratio between the thickness and the sectional area is calculated, the type of the unit is not particularly limited as long as the above-described range (I) or (II) is satisfied.

By using the adsorbent 13 according to the exemplary embodiment, it is possible to maintain the degree of vacuum (decompressed state) of the inside of the vacuum heat-insulating material 10, and to suppress a possibility that the core material deteriorates due to vapor or the like. In particular, since the adsorption by the chemical adsorbent is stronger than that of the physical adsorption and is generally irreversible adsorption, the moisture which is once adsorbed is rarely desorbed. Therefore, it is possible to appropriately use the chemical adsorbent as the adsorbent 13 of the vacuum heat-insulating material 10.

In this manner, according to the exemplary embodiment, in the heat-insulating container which is used under the environment where the exposure to the water of the liquid is possible and holds the substance at the temperature which is lower than the normal temperature, the vacuum heat-insulating material used in the heat-insulating container includes the outer cover material and the inner member sealed in a tightly closed and decompressed state on the inside of the outer cover material. In addition, when the outer cover material is ruptured and the water of the liquid enters the inside, the inner member is configured of a material which does not cause hydrogen generation in a case of coming into contact with the moisture.

Accordingly, if by any chance the outer cover material is ruptured and the water which is the liquid enters the inside of the vacuum heat-insulating material, it is possible to avoid generation of hydrogen on the inside of the vacuum heat-insulating material. Therefore, in the heat-insulating container being used under the environment where the exposure to the water of the liquid is possible, even in a case where the vacuum heat-insulating material used in the heat-insulating container is ruptured and the water of the liquid comes into contact with the inner member, it is possible to avoid or suppress influence on the stored low-temperature substance.

In addition, in the exemplary embodiment, the LNG transport tanker which is an example of the heat-insulating container is illustrated, but the present invention is not limited thereto, and for example, similarly, in a case of a hydrogen transport tanker which stores hydrogen of which the temperature is equal to or lower than the normal temperature in a liquid state, effects similar to those of the exemplary embodiment can be obtained.

Second Exemplary Embodiment

Next, a second exemplary embodiment of the present invention will be described.

In the first exemplary embodiment, as a representative example of the heat-insulating container, the spherical tank 101 provided in the LNG transport tanker 100A illustrated in FIGS. 1A and 1B is illustrated. However, the present invention is not limited thereto, and in the second exemplary embodiment, as illustrated in FIGS. 3A and 3B, a case of an LNG inboard tank 110 provided in a membrane type LNG transport tanker 100B will be described.

Figure 3A:
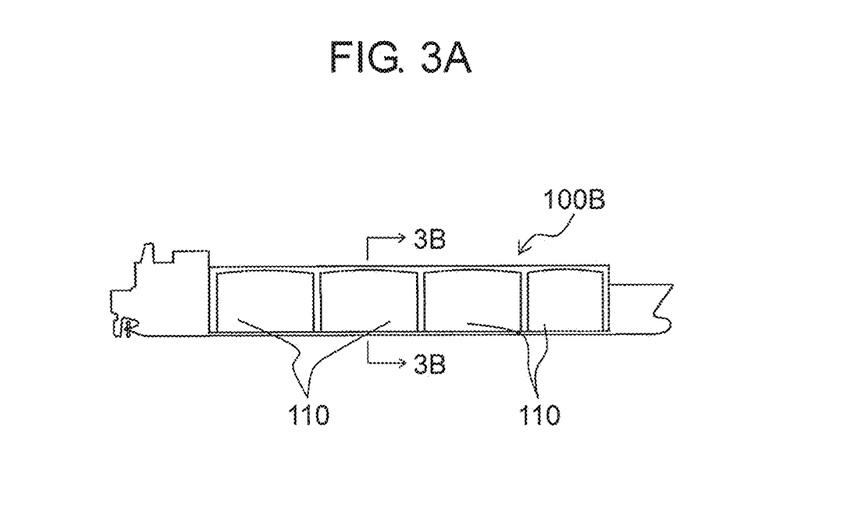
FIG. 3A is a schematic view illustrating a schematic configuration of a membrane type LNG transport tanker provided with an inboard tank which is a heat-insulating container according to a second exemplary embodiment of the present invention.

As illustrated in FIG. 3A, the LNG transport tanker 100B in the exemplary embodiment is a membrane type tanker, and includes a plurality of inboard tanks 110 (four in total in FIG. 3A). The plurality of inboard tanks 110 are arranged in one row along the longitudinal direction of a ship body 111. In each of the inboard tanks 110, as illustrated in FIG. 3B, the inside becomes an inner space (substance holding portion) in which the LNG is stored (held). In addition, most of the inboard tank 110 is supported on the outside by the ship body 111, and an upper part thereof is tightly closed by a deck 112.

Figure 3B:
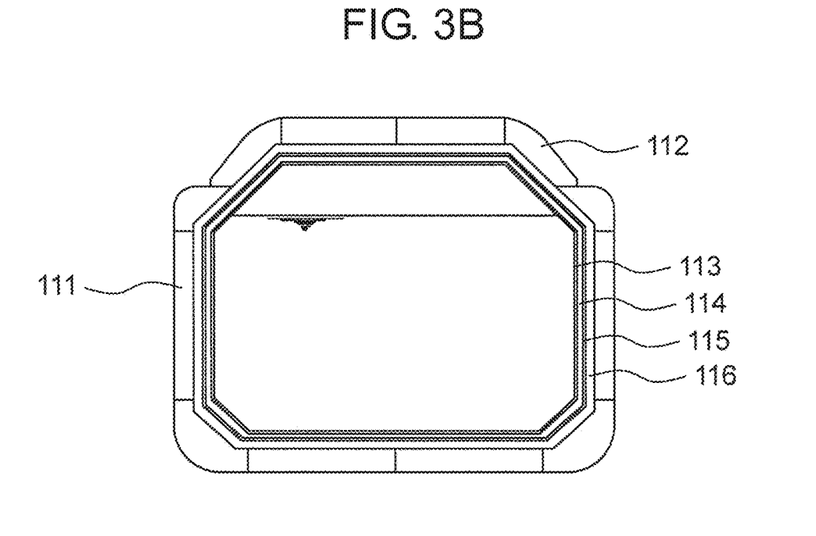
FIG. 3B is a schematic view illustrating a schematic configuration of the inboard tank which corresponds to a section taken along an arrow 3B-3B of FIG. 3A.

On an inner surface of the inboard tank 110, as illustrated in FIG. 3B, a primary membrane 113, a primary heat-insulating box 114, a secondary membrane 115, and a secondary heat-insulating box 116 are layered in this order toward the outside from the inside. Accordingly, on the inner surface of the inboard tank 110, a double "heat-insulating tank structure" (or a heat-preventing structure) is formed. The "heat-insulating tank structure" referred here indicates a structure configured of a layer (heat-insulating layer) of a heat-insulating material (heat-preventing material) and a metal membrane. The "heat-insulating tank structure" (primary heat-preventing structure) on the inner side is configured of the primary membrane 113 and the primary heat-insulating box 114, and the "heat-insulating tank structure" (secondary heat-preventing structure) on the outer side is configured of the secondary membrane 115 and the secondary heat-insulating box 116.

The heat-insulating layer prevents (or suppresses) the heat from entering into the inner space from the outside of the inboard tank 110, and in the exemplary embodiment, the primary heat-insulating box 114 and the secondary heat-insulating box 116 are used. In other words, in the exemplary embodiment, the primary heat-insulating box 114 and the secondary heat-insulating box 116 function as a heat-insulating structure body. The primary heat-insulating box 114 and the secondary heat-insulating box 116 may be configured by accommodating the heat-insulating material on the inside of the heat-insulating box, and a specific configuration thereof is not particularly limited. In the exemplary embodiment, for example, the primary heat-insulating box 114 and the secondary heat-insulating box 116 can be configured as a configuration in which the plurality of heat-insulating boxes which accommodate the heat-insulating material are integrated (integrated heat-insulating box).

In the primary heat-insulating box 114 and the secondary heat-insulating box 116, for example, a powder heat-insulating material is accommodated. An example of the powder heat-insulating material includes pearlite which is an inorganic foam material, but the type of the powder heat-insulating material is not limited to the pearlite. For example, a heat-insulating material which is made of a foam resin material selected from styrene foam, polyurethane foam, and phenolic foam, may be employed, not the foam material but an inorganic fiber, such as glass wool, may be employed, or other known heat-insulating material may be employed. In addition, as illustrated in the first exemplary embodiment, the powder heat-insulating material may be a heat-insulating panel formed not in a shape of powder but in a shape of a panel. In the membrane type LNG transport tanker 100B, generally, a foam body, such as pearlite is used as the powder heat-insulating material.

In addition, on the bottom surface of the secondary heat-insulating box 116, the vacuum heat-insulating material 10 which is not illustrated in FIG. 3B and is described above is provided. The vacuum heat-insulating material 10 is a heat-insulating material (heat-insulating material having excellent heat-insulating performance) having a lower thermal conductivity $\lambda$ than that of the powder heat-insulating material. Therefore, by providing the vacuum heat-insulating material 10 on the outer side of the secondary heat-insulating box 116 which is positioned on the outer side as a heat-insulating layer, it is possible to suppress or prevent the heat transfer from the outside, and to suppress or prevent cold (cold air) on the inside from leaking to the outside.

The membrane functions as "tank" for holding the LNG not to be leaked on the inner space, and is used to cover the upper part of the heat-insulating material. In the exemplary embodiment, the primary membrane 113 which covers the upper part (inner side) of the primary heat-insulating box 114, and the secondary membrane 115 which covers the upper part (inner side) of the secondary heat-insulating box 116 are used. The primary membrane 113 configures an inner tank of the heat-insulating container, the secondary membrane 115 configures an intermediate tank of the heat-insulating container, and the ship body 111 configures an outer tank of the heat-insulating container. A specific configuration of the primary membrane 113 and the secondary membrane 115 is not particularly limited, but representatively, a metal film, such as stainless steel or invar (nickel steel containing 36% of nickel).

In addition, both of the primary membrane 113 and the secondary membrane 115 are members which do not leak the LNG, but do not have strength to maintain the structure as the inboard tank 110. The structure of the inboard tank 110 is supported by the ship body 111 (deck 112). In other words, leakage of the LNG from the inboard tank 110 is prevented by the primary membrane 113 and the secondary membrane 115, and a load of the LNG is supported by the ship body 111 via the primary heat-insulating box 114 and the secondary heat-insulating box 116. Therefore, in a case where the inboard tank 110 is viewed as the heat-insulating container, the ship body 111 is an outer tank and configures the "container housing body".

In the exemplary embodiment, the vacuum heat-insulating material 10 provided in the secondary heat-insulating box 116 is configured of a material which does not cause hydrogen generation in a case where the inner member, for example, the adsorbent 13 comes into contact with the moisture when the water of the liquid enters the inside due to the rupture of the outer cover material 11. Accordingly, if by any chance the outer cover material 11 is ruptured and the water which is the liquid enters the inside of the vacuum heat-insulating material 10, it is possible to avoid generation of hydrogen on the inside of the vacuum heat-insulating material 10, and to avoid or suppress influence on the stored LNG.

Third Exemplary Embodiment

Next, a third exemplary embodiment of the present invention will be described.

The heat-insulating container according to the first exemplary embodiment and the second exemplary embodiment is the spherical tank 101 provided in the LNG transport tanker 100A or the inboard tank 110 provided in a LNG transport tanker 100B. However, the heat-insulating container of the present invention is not limited thereto, and for example, may be an LNG tank installed on the ground. In the third exemplary embodiment, the LNG tank will be described with reference to FIGS. 4 and 5.

Figure 4:
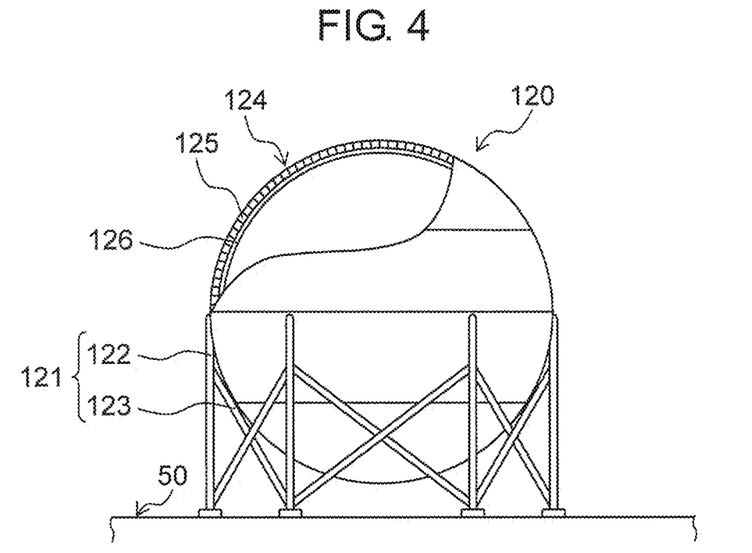
FIG. 4 is a schematic sectional view illustrating a representative configuration of a ground LNG tank which is a heat-insulating container according to a third exemplary embodiment of the present invention.

In FIG. 4, a ground LNG tank 120 is illustrated. The ground LNG tank 120 is provided with a spherical container main body 124 as a tank main body similar to the spherical tank 101 of the first exemplary embodiment, and the container main body 124 is supported on a ground surface 50 by a support structure portion 121. The support structure portion 121 is configured of a plurality of columns 122 provided in the perpendicular direction on the ground surface 50, and a brace 123 provided between the columns 122, but are not particularly limited to the configuration.

The container main body 124 includes a container housing body 126 which holds the low-temperature substance, and a heat-insulating structure body 125 provided on an outer side of the container housing body 126. A specific configuration of the container housing body 126 and the heat-insulating structure body 125 is as described in the first exemplary embodiment and the second exemplary embodiment, and in particular, as the heat-insulating structure body 125, the vacuum heat-insulating material 10 which is configured of a material that does not cause hydrogen generation in a case where the inner member comes into contact with the moisture is appropriately used as described in the first exemplary embodiment.

Figure 5:
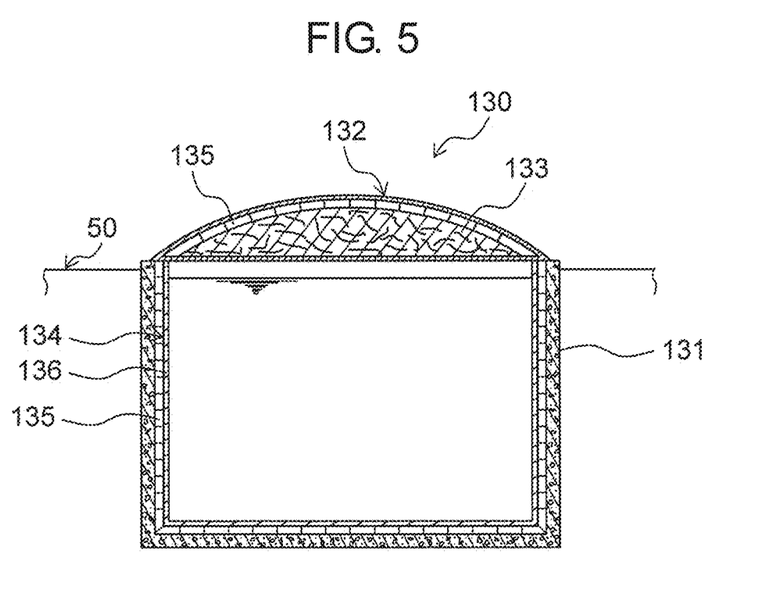
FIG. 5 is a schematic sectional view illustrating a representative configuration of an underground LNG tank which is the heat-insulating container according to the third exemplary embodiment of the present invention.

In FIG. 5, an underground LNG tank 130 is illustrated. The underground LNG tank 130 is provided with a cylindrical container main body 134 on the inside of a concrete structure body 131 embedded on the ground surface 50, and the cylindrical container main body 134 is provided with a container housing body 136 which holds the low-temperature substance and a heat-insulating structure body 135 provided on the outer side of the container housing body 136. The concrete structure body 131 is configured of, for example, a prestressed concrete, and is installed underground so that a large part thereof is below the ground surface 50. The concrete structure body 131 is a support body which supports a structure of the tank main body of the underground LNG tank 130, and functions as a barrier that is provided against possible damage of the tank main body and prevents leakage of the LNG.

In addition, in an upper opening of the cylindrical container main body 134, a roof portion 132 which is separated from the cylindrical container main body 134 is provided. An upper surface of the roof portion 132 is a projected curved surface, and a lower surface is a flat surface. On the outer side of the roof portion 132, similar to the cylindrical container main body 134, the heat-insulating structure body 135 is provided, and on the inside thereof, a fiber-like heat-insulating material 133 is provided. An example of the fiber-like heat-insulating material 133 can include an inorganic fiber used as the core material 12 of the vacuum heat-insulating material 10. A specific configuration of the container housing body 136 and the heat-insulating structure body 135 is as described in the first exemplary embodiment or the second exemplary embodiment, and in particular, as the heat-insulating structure body 135, as described in the first exemplary embodiment, the vacuum heat-insulating material 10 which is configured of a material that does not cause hydrogen generation in a case where the inner member comes into contact with the moisture is appropriately used.

Since any of the ground LNG tank 120 and the underground LNG tank 130 is also a heat-insulating container installed outdoors, the ground LNG tank 120 and the underground LNG tank 130 are used under the environment where the exposure to the water of the liquid, such as rain water, is possible. In addition, in a case of the underground LNG tank 130, a possibility of coming into contact with groundwater is also assumed. According to the exemplary embodiment, the vacuum heat-insulating material 10 provided in the heat-insulating structure bodies 125 and 135 are configured of a material which does not cause hydrogen generation in a case where the inner member, for example, the adsorbent 13, comes into contact with the moisture, when the outer cover material 11 is ruptured and the water of the liquid enters the inside. Accordingly, in the ground LNG tanks 120 and 130, if by any chance the outer cover material 11 is ruptured and the water which is the liquid enters the inside of the vacuum heat-insulating material 10, it is possible to avoid generation of hydrogen on the inside of the vacuum heat-insulating material 10, and to avoid or suppress influence on the stored LNG.

Fourth Exemplary Embodiment

Next, a fourth exemplary embodiment of the present invention will be described.

In any of the first to third exemplary embodiments, the low-temperature substance held in the heat-insulating container is the LNG. However, the present invention is not limited thereto, and the low-temperature substance may be a substance which is held at the temperature that is lower than the normal temperature, and preferably, may be a substance which is held at the temperature which is lower than the normal temperature by 100° C. or more. In the fourth exemplary embodiment, as the low-temperature substance other than the LNG, hydrogen gas is illustrated as an example. An example of the hydrogen tank which liquefies and holds the hydrogen gas will be specifically described with reference to FIG. 6.

Figure 6:
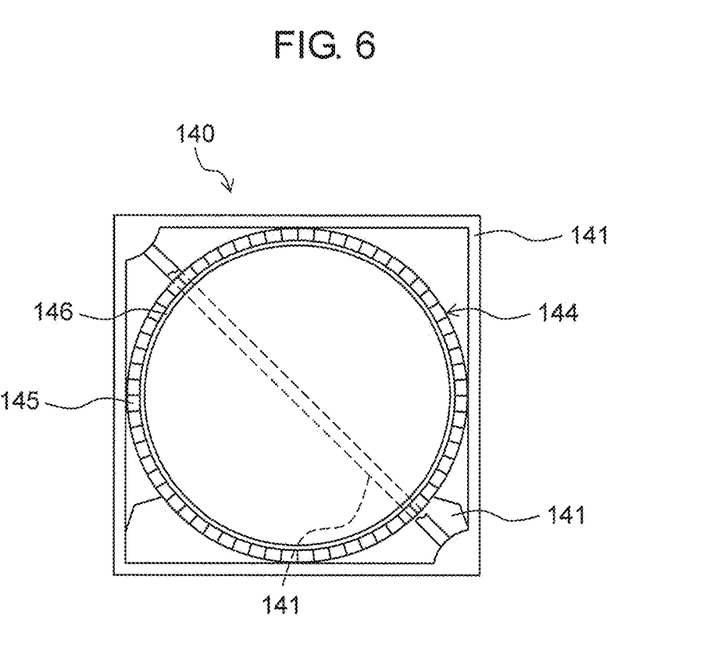
FIG. 6 is a schematic sectional view illustrating a representative configuration of a hydrogen tank which is a heat-insulating container according to a fourth exemplary embodiment of the present invention.

As illustrated in FIG. 6, a hydrogen tank 140 according to the exemplary embodiment is a container type, and basically, has a configuration which is similar to that of the spherical tank 101 described in the first exemplary embodiment or the ground LNG tank 120 described in the third exemplary embodiment. In other words, the hydrogen tank 140 is provided with a container main body 144 which is a tank main body in a frame-like support body 141, and the container main body 144 is provided with a container housing body 146 which holds the low-temperature substance and a heat-insulating structure body 145 provided on an outer side of the container housing body 146. A specific configuration of the container housing body 146 and the heat-insulating structure body 145 is as described in the first to third exemplary embodiments, and in particular, as the heat-insulating structure body 145, as described in the first exemplary embodiment, the vacuum heat-insulating material 10 which is configured of the material that does not cause hydrogen generation in a case where the inner member comes into contact with the moisture is appropriately used.

In general, liquefied hydrogen (liquid hydrogen) is liquid at an extremely low temperature that is −253° C., and compared to the LNG, ease of evaporation becomes approximately 10 times higher. Therefore, regarding the liquefied hydrogen, in order to obtain an evaporation loss level which is similar to that of the LNG, it is necessary to further improve heat-insulating performance (low thermal conductivity) of the heat-insulating material. Meanwhile, in the exemplary embodiment, since the heat-insulating structure body 145 which is similar to the configuration described in the first to third exemplary embodiments is used, regarding the hydrogen tank 140, it is possible to achieve further higher heat-insulation.

In addition, when the hydrogen tank 140 is a container type, it is assumed that the hydrogen tank 140 is positioned at a place exposed to rain water, or transport is performed under environment of being exposed to rain water. In addition, as transport means, not being limited to means of ground transportation, such as a truck or a train, and means of marine transportation, such as a ship, is also assumed. Therefore, the hydrogen tank 140 is used under the environment where the exposure not only to rain water but also to seawater is possible.

According to the exemplary embodiment, the vacuum heat-insulating material 10 provided in the heat-insulating structure body 145 is configured of a material which does not cause hydrogen generation in a case where the inner member, for example, the adsorbent 13 comes into contact with the moisture when the outer cover material 11 is ruptured and the water of the liquid enters the inside. Accordingly, in the hydrogen tank 140, if by any change the outer cover material 11 is ruptured and the water which is the liquid enters the inside of the vacuum heat-insulating material 10, it is possible to avoid generation of hydrogen on the inside of the vacuum heat-insulating material 10, and to avoid or suppress influence on the stored liquefied hydrogen.

In addition, in the exemplary embodiment, the low-temperature substance held in the heat-insulating container is not limited to the LNG or the liquefied hydrogen, and may be a substance (preferably, fluid having flowability at a temperature which is lower than the normal temperature by 100° C. or more) held at the temperature which is lower than the normal temperature. When the fluid is employed as an example, examples of a fluid other than the LNG and the hydrogen gas can include liquefied petroleum gas (LPG), other carbon hydrogen gas, or combustible gas including the LPG or other carbon hydrogen gas.

In addition, various compounds transported by a chemical tanker or the like may be employed, and compounds held at the temperature which is lower than the normal temperature may be employed. Furthermore, the heat-insulating container which can employ the present invention may be a medical or industrial low-temperature holding container or the like. In addition, the normal temperature may be a temperature which is within a range of 20° C.±5° C. (within a range of 15° to 25° C.).

As described above, the present invention is not limited to the above-described exemplary embodiments, various changes are possible within a range illustrated in the range of claims, and the exemplary embodiment in which technical methods disclosed in each of the various exemplary embodiments and a plurality of modification examples can be appropriately combined is included in a technical range of the present invention.

A heat-insulating container according to the first aspect of the present invention is used under an environment where exposure to moisture of liquid is possible, includes a container main body having a substance holding portion which holds a substance at a temperature which is lower than a normal temperature on the inside of the substance holding portion; and a heat-insulating structure body which is provided in the container main body, and includes at least a vacuum heat-insulating material. In addition, the vacuum heat-insulating material includes an outer cover material, and an inner member which is sealed in a tightly closed and decompressed state on an inside of the outer cover material. In addition, the inner member is configured of a material which does not generate hydrogen in a case of coming into contact with the moisture of the liquid.

According to the configuration, since the inner member is a member which practically does not generate the hydrogen in a case of coming into contact with the moisture of the liquid, if by any chance the outer cover material is ruptured and the water which is the liquid enters the inside of the vacuum heat-insulating material, it is possible to avoid generation of hydrogen on the inside of the vacuum heat-insulating material. Therefore, in the heat-insulating container being used under the environment where the exposure to the moisture of the liquid is possible, even in a case where the vacuum heat-insulating material used in the heat-insulating container is ruptured and the water of the liquid comes into contact with the inner member, it is possible to avoid or suppress influence on the stored low-temperature substance.

In particular, in a case where the adsorbent which is the inner member is the chemical adsorbent, when the chemical adsorbent adsorption-reacts to the water of the liquid, it is assumed that more intense chemical reaction occurs than that of the adsorption-reaction between the gas and the moisture (that is, vapor). Meanwhile, according to such a configuration, since it is possible to avoid generation of hydrogen on the inside of the vacuum heat-insulating material, it is possible to avoid or suppress influence on the stored low-temperature substance.

In addition, according to a second aspect, in the heat-insulating container according to the first aspect, the inner member included in the vacuum heat-insulating material may include a core material having heat-insulating properties, and an adsorbent which is capable of adsorbing gas on the inside of the outer cover material.

According to the configuration, since the core material and the adsorbent which are inner members can be configured of a material which does not cause hydrogen generation in a case of coming into contact with the moisture, even in a case where the vacuum heat-insulating material is ruptured and the water of the liquid comes into contact with the inner member, it is possible to avoid or suppress influence on the stored low-temperature substance.

In addition, according to a third aspect, in the heat-insulating container of the second aspect, at least one of materials among a material which does not chemically react to water, a material of which a hydrogen generation amount per 1 g is less than 80 mL when chemically reacting to the water, and a material of which a standard electrode potential is equal to or greater than −2.0 V, may be used as an element material which forms the adsorbent.

According to the configuration, in a case of a material which satisfies any of the above-described conditions, practically, since the material can be considered as a material which does not cause hydrogen generation in a case of coming into contact with the moisture, in a case where the vacuum heat-insulating material is ruptured and the water of the liquid comes into contact with the inner member, it is possible to avoid or suppress influence on the stored low-temperature substance.

In addition, according to a fourth aspect, in the second aspect or the third aspect, at least any one condition among (1) a condition that the adsorbent has a shape of particles and particles having a particle diameter which is within a range of 0.01 to 1400 μm are 80% by volume or more, (2) a condition that the adsorbent has a shape of particles of which an average particle diameter is within a range of 0.01 to 1400 μm, (3) a condition that the adsorbent has a shape of particles of which density is within a range of 0.2 to 1.4 g/mL, and (4) a condition that the adsorbent has a shape of particles of which a specific surface area is within a range of 200 to 2000 $m^2/g$, may be satisfied.

According to the configuration, since the adsorbent satisfies the above-described conditions, it is possible not only not to generate the hydrogen generation in a case of coming into contact with the moisture, but also to realize excellent adsorption performance.

In addition, according to a fifth aspect, in the second to fourth aspects, the adsorbent may be processed to have a shape having a thickness which is equal to or less than 60% of a thickness of the vacuum heat-insulating material, or a shape of which a ratio (for example, unit: $mm^2$) of a sectional area with respect to the thickness (for example, unit: mm) is within a range of 1:100 to 1:250.

According to the configuration, since the adsorbent satisfies the above-described conditions, it is possible not only not to generate the hydrogen generation in a case of coming into contact with the moisture, but also to suppress generation of heat transfer via the adsorbent and to avoid deterioration of heat-insulation.

In addition, according to a sixth aspect, in the fifth aspect, a heat-insulating member may be layered on or covers upper and lower surfaces in a thickness direction of the vacuum heat-insulating material, in the adsorbent.

According to the configuration, since the adsorbent is covered with the heat-insulating member, it is possible to suppress generation of heat transfer via the adsorbent, and to avoid a concern abound deterioration of heat-insulation.

In addition, according to a seventh aspect, in the second to sixth aspects, the core material may be configured of an inorganic fiber or a thermosetting foam body.

According to the configuration, since a material which does not cause hydrogen generation in a case where the core material practically comes into contact with the moisture, even in a case where the vacuum heat-insulating material is ruptured and the water of the liquid comes into contact with the inner member, it is possible to avoid or suppress influence on the stored low-temperature substance.

In addition, according to an eighth aspect, in the first to seventh aspects, the substance may be combustible liquefied gas of which a temperature is equal to or lower than the normal temperature by 100° C. or more.

According to the configuration, since the stored low-temperature substance is combustible liquefied gas, as influence on the stored liquefied gas is avoided or suppressed, it is possible to improve storage properties of the liquefied gas.

In addition, according to a ninth aspect, in the first to eighth aspects, the substance may be hydrogen.

According to the configuration, since the stored low-temperature substance is liquid hydrogen or liquid hydrogen which coexists with the hydrogen gas, as influence on the stored liquid hydrogen or the like is avoided or suppressed, it is possible to improve storage properties of hydrogen gas.

In addition, in the present invention, the vacuum heat-insulating material used in the heat-insulating container having the configuration is also included. In other words, the vacuum heat-insulating material according to a tenth aspect of the present invention is employed in a heat-insulating container being used under the environment where exposure to moisture of liquid is possible, and is used in the heat-insulating container including a container main body having a substance holding portion which holds a substance at a temperature which is lower than a normal temperature on an inside of the substance holding portion, and a heat-insulating structure body which is provided in the container main body and uses at least a vacuum heat-insulating material. In addition, an outer cover material and an inner member which is sealed in a tightly closed and decompressed state on an inside of the outer cover material, are provided. In addition, the inner member is configured of a material which does not generate hydrogen in a case of coming into contact with the moisture of the liquid.

In addition, a tanker according to an eleventh aspect of the present invention includes the heat-insulating container having the above-described configuration, and the substance is liquefied natural gas or hydrogen.

INDUSTRIAL APPLICABILITY

As described above, according to the present invention, when the inner member of the vacuum heat-insulating material and the moisture react to each other, by observing hydrogen generation assuming a risk which is influence on the stored low-temperature substance, and by suppressing ignition caused by the hydrogen generation, it becomes possible to substantially improve reliability of the heat-insulating container provided with the vacuum heat-insulating material. Accordingly, the present invention can be widely and appropriately employed in fields, such as a heat-insulating container which is used under the environment where exposure to water of liquid is possible, holds a substance at a low temperature that is lower than a normal temperature, and is provided with a vacuum heat-insulating material, a vacuum heat-insulating material used in the heat-insulating container, and a tanker heat-insulating container provided with the heat-insulating container, and is efficient.

REFERENCE MARKS IN THE DRAWINGS

10 VACUUM HEAT-INSULATING MATERIAL
11 OUTER COVER MATERIAL (OUTER PACKAGE MATERIAL)
12 CORE MATERIAL
13 ADSORBENT
50 GROUND SURFACE
100A, 100B, LNG TRANSPORT TANKER
101 SPHERICAL TANK (HEAT-INSULATING CONTAINER)
102 SHIP BODY
103 COVER
104, 124, 134, 144 CONTAINER MAIN BODY
105, 125, 135, 145 HEAT-INSULATING STRUCTURE BODY
106, 126, 136, 146 CONTAINER HOUSING BODY
107 SUPPORT BODY
110 INBOARD TANK (HEAT-INSULATING CONTAINER)
111 SHIP BODY
112 DECK
113 PRIMARY MEMBRANE (IN-CONTAINER TANK)
114 PRIMARY HEAT-INSULATING BOX
115 SECONDARY MEMBRANE (INTERMEDIATE TANK)
116 SECONDARY HEAT-INSULATING BOX
120 GROUND LNG TANK (HEAT-INSULATING CONTAINER)
121 SUPPORT STRUCTURE PORTION
122 COLUMN
123 BRACE
130 UNDERGROUND LNG TANK (HEAT-INSULATING CONTAINER)
131 CONCRETE STRUCTURE BODY
132 ROOF PORTION
133 FIBER-LIKE HEAT-INSULATING MATERIAL
140 HYDROGEN TANK (HEAT-INSULATING CONTAINER)
141 SUPPORT BODY

The invention claimed is:

1. A heat-insulating container which is used under an environment where exposure to moisture of liquid is possible, comprising:
a container main body having a substance holding portion which holds a substance at a temperature which is lower than a normal temperature on an inside of the substance holding portion; and
a heat-insulating structure body which is provided in the container main body, and includes at east a vacuum heat-insulating material,
wherein the vacuum heat-insulating material includes an outer cover material, and an inner member which is sealed in a closed and decompressed state on an inside of the outer cover material,
wherein the inner member is configured of a material which does not generate hydrogen in a case of coming into contact with the moisture of the liquid,
wherein the substance is combustible liquefied gas of which a temperature is equal to or lower than the normal temperature by 100° C. or more,
wherein the inner member included in the vacuum heat-insulating material includes a core material having heat-insulating properties and an adsorbent which is capable of adsorbing gas on the inside of the outer cover material, and
wherein the adsorbent is processed to have a shape of which a ratio of a sectional area (CS) with respect to a thickness (T2) is within a range of T2:CS=1:100 to 1:250.

2. The heat-insulating container according to claim 1,
wherein at least one of materials among a material which does not chemically react to water, a material of which a hydrogen generation amount per 1 g is less than 80 mL when chemically reacting to the water, and a material of which a standard electrode potential is equal to or greater than −2.0 V, is used as an element material which forms the adsorbent.

3. The heat-insulating container according to claim 1,
wherein at least any one condition among (1) a condition that the adsorbent has a shape of particles and particles having a particle diameter which is within a range of 0.01 to 1400 μm are 80% by volume or more, (2) a condition that the adsorbent has a shape of particles of which an average particle diameter is within a range of 0.01 to 1400 μm, (3) a condition that the adsorbent has a shape of particles of which density is within a range of 0.2 to 1.4 g/mL, and (4) a condition that the adsorbent has a shape of particles of which a specific surface area is within a range of 200 to 2000 m$^2$/g, is satisfied.

4. The heat-insulating container according to claim 1,
wherein the adsorbent is processed to have a shape having a thickness which is equal to or less than 60% of a thickness of the vacuum heat-insulating material.

5. The heat-insulating container according to claim 4,
wherein a heat-insulating member is layered on or covers upper and lower surfaces in a thickness direction of the vacuum heat-insulating material, in the adsorbent.

6. The heat-insulating container according to claim 1,
wherein the core material is configured of an inorganic fiber or a thermosetting foam body.

7. The heat-insulating container according to claim 1,
wherein the substance is hydrogen.

8. A vacuum heat-insulating material which is employed in a heat-insulating container being used under the environment where exposure to moisture of liquid is possible, and is used in the heat-insulating container including a container main body having a substance holding portion which holds a substance at a temperature which is lower than a normal temperature on an inside of the substance holding portion, and a heat-insulating structure body which is provided in the container main body and uses at least a vacuum heat-insulating material, the material comprising:
- an outer cover material; and
- an inner member which is sealed in a closed and decompressed state on an inside of the outer cover material,
- wherein the inner member is configured of a material which does not generate hydrogen in a case of coming into contact with the moisture of the liquid,
- wherein the substance is combustible liquefied gas of which a temperature is equal to or lower than the normal temperature by 100° C. or more,
- wherein the inner member included in the vacuum heat-insulating material includes a core material having heat-insulating properties and an adsorbent which is capable of adsorbing gas on the inside of the outer cover material, and
- wherein the adsorbent is processed to have a shape of which a ratio of a sectional area (CS) with respect to a thickness (T2) is within a range of T2:CS=1:100 to 1:250.

9. A tanker comprising:
the heat-insulating container according to claim 1,
wherein the substance is liquefied natural gas or hydrogen.

10. A tanker comprising:
the heat-insulating container according to claim 2,
wherein the substance is liquefied natural gas or hydrogen.

11. A tanker comprising:
the heat-insulating container according to claim 3,
wherein the substance is liquefied natural gas or hydrogen.

12. A tanker comprising:
the heat-insulating container according to claim 4,
wherein the substance is liquefied natural gas or hydrogen.

13. A tanker comprising:
the heat-insulating container according to claim 5,
wherein the substance is liquefied natural gas or hydrogen.

14. A tanker comprising:
the heat-insulating container according to claim 6,
wherein the substance is liquefied natural gas or hydrogen.

15. A tanker comprising:
the heat-insulating container according to claim 7,
wherein the substance is liquefied natural gas or hydrogen.

* * * * *